US006527303B2

(12) United States Patent
Kariyama et al.

(10) Patent No.: US 6,527,303 B2
(45) Date of Patent: Mar. 4, 2003

(54) HYDRAULIC HOSE ASSEMBLY FOR BICYCLE

(75) Inventors: Osamu Kariyama, Sakai (JP); Masanori Sugimoto, Osakasayama (JP); Yuzuru Uchiyama, Osaka (JP); Rikimasa Ohishi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/872,012

(22) Filed: Jun. 4, 2001

(65) Prior Publication Data

US 2002/0180209 A1 Dec. 5, 2002

(51) Int. Cl.[7] ............................................... F16L 33/00
(52) U.S. Cl. ..................... 285/249; 285/341; 285/246
(58) Field of Search ................. 285/341, 249, 285/115, 247, 246, 250, 334.2

(56) References Cited

U.S. PATENT DOCUMENTS

| 3,112,940 | A | * | 12/1963 | Crawford ................ 285/341 |
| 3,596,933 | A | * | 8/1971 | Luckenbill ............ 285/246 X |
| 3,685,860 | A | * | 8/1972 | Schmidt .................. 285/249 |
| 4,335,908 | A | * | 6/1982 | Burge ................. 285/250 X |
| 4,798,404 | A | * | 1/1989 | Iyanicki ............. 285/249 X |
| 5,135,266 | A | * | 8/1992 | Bridges et al. ...... 285/341 X |
| 5,449,205 | A | * | 9/1995 | Silletti et al. ........ 285/249 X |
| 6,361,084 | B1 | * | 3/2002 | Zarbo ...................... 285/341 |

FOREIGN PATENT DOCUMENTS

| GB | 2121133 | * | 12/1983 | ............ 285/246 X |

OTHER PUBLICATIONS

Magura Bushing, downloaded from Patolis Japanese Patent Database.

* cited by examiner

Primary Examiner—Lynne H. Browne
Assistant Examiner—David E. Bochna
(74) Attorney, Agent, or Firm—Shinjyu Global IP Counselors, LLP (57) ABSTRACT

A hydraulic hose assembly is provided for connecting hydraulic components of a bicycle. The hydraulic hose assembly has a flexible hose, a rigid tubular insert, connecting fastener and a tubular bushing. The compression bushing surrounds the flexible hose in order that the connecting fastener can be tightened to compress the bushing into a watertight seal. The compression bushing has an annular recess that is located between a pair of inclined sections. The annular recess is configured to limit the amount of radial expansion of the outer diameter of the bushing when the hydraulic hose assembly is coupled to the bicycle component.

19 Claims, 12 Drawing Sheets

HYDRAULIC HOSE ASSEMBLY FOR BICYCLE

BACKGROUND OF THE INVENTION

1. Field of the Invention

This invention generally relates to a hydraulic hose assembly that is coupled to bicycle components such as brake systems, gear shifting systems and other hydraulically operated bicycle components. More specifically, the present invention relates a compression bushing of a hydraulic hose assembly that surrounds a flexible hose in order that a connecting fastener can be tightened to compress the bushing to form a watertight seal therebetween.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In the past, the bicycle components were usually controlled by mechanically cables. However, many of the bicycle components have recently become hydraulically controlled. For example, the braking systems for many bicycles now included disc brakes.

A disc brake system basically includes a brake lever operatively coupled to a brake caliper that selectively engages a brake disc rotor. The hydraulic disc brake system is hydraulically controlled by hydraulic fluid flowing through a hydraulic hose coupled between the brake lever and the brake caliper.

A gear shifting system basically includes a shifting lever operatively coupled to a derailleur that selectively moves the chain of the bicycle between gears. The hydraulic gear shifting system is hydraulically controlled by hydraulic fluid flowing through a hydraulic hose coupled between the shifting lever and the derailleur.

In the case of hydraulically controlled bicycle components, the hydraulic hoses sometime become damaged or worn out. Thus, the hydraulic hose may have to be replaced. In the prior art hydraulically controlled bicycle components, hydraulic hose fittings are coupled to the ends of the hydraulic hose for coupling the bicycle components thereto. Sometimes these hydraulic hose fittings are very difficult to disconnect. Specifically, these hydraulic hose fittings have compression bushings that are expanded radially outward such that the expansion of the outer diameter of the bushing makes it difficult to disconnect the hydraulic hose fitting from the bicycle component.

In view of the above, there exists a need for an improved bushing design which overcomes the above mentioned problems in the prior art. This invention addresses this need in the prior art as well as other needs, which will become apparent to those skilled in the art from this disclosure.

SUMMARY OF THE INVENTION

One object of the present invention is to provide an improved bushing design for improving the disconnection of a hydraulic hose fitting between a hydraulic hose and a bicycle component.

The foregoing objects can further be attained by providing a compression bushing for a hydraulic hose. The compression bushing basically includes a body portion, an inner cylindrical surface and an outer surface. The body portion has a first axial end and a second axial end. The inner cylindrical surface extends between the first and second axial ends of the body portion. The outer surface extends between the first and second axial ends of the body portion. The outer surface includes a first inclined section, a second inclined section and an intermediate section. The first inclined section decreases in radial width as the first inclined section approaches the first axial end of the body portion. The second inclined section decreasing in radial width as the second inclined section approaches the second axial end of the body portion. The intermediate section is located between the first and second inclined sections. The intermediate section has an annular recess.

The foregoing objects can further be attained by providing a hydraulic hose assembly for connecting hydraulic components of a bicycle. The hydraulic hose assembly basically includes a flexible hose, a rigid tubular insert, a connecting fastener and a tubular bushing. The flexible hose has a first end, a second end and an interior passage extending between the first and second ends of the flexible hose. The rigid tubular insert is located in the interior passage adjacent the first end of the flexible hose. The connecting fastener has a longitudinal bore with a portion of the flexible hose disposed therein. The tubular bushing is disposed over the flexible hose at the rigid tubular insert. The tubular bushing has an outer surface extending between the first and second axial ends of the tubular bushing. The outer surface of the tubular bushing includes a first inclined section, a second inclined section and an intermediate section. The first inclined section decreases in radial width as the first inclined section approaches the first axial end of the tubular bushing. The second inclined section decreasing in radial width as the second inclined section approaches the second axial end of the tubular bushing. The intermediate section is located between the first and second inclined sections. The intermediate section has an annular recess.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
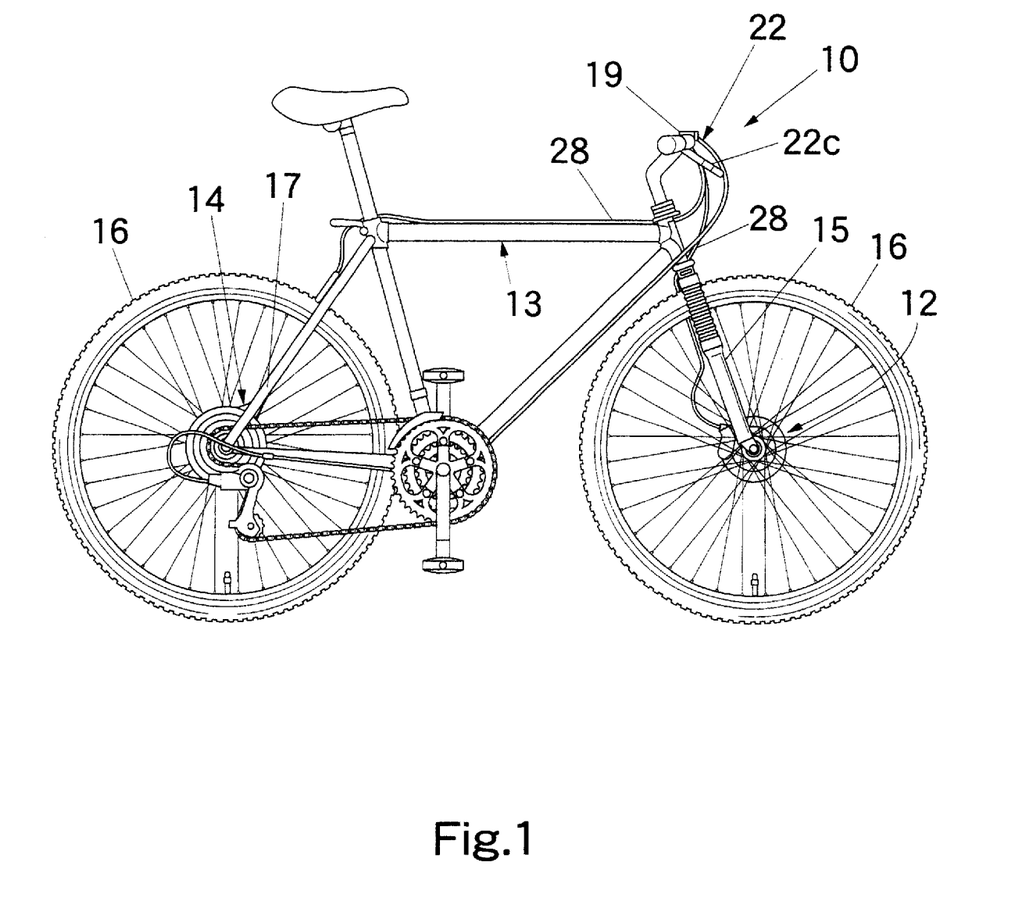
FIG. 1 is a side elevational view of a bicycle with a front disc brake assembly and a rear disc brake assembly that uses a hydraulic hose assembly in accordance with an embodiment of the present invention.
Figure 2:
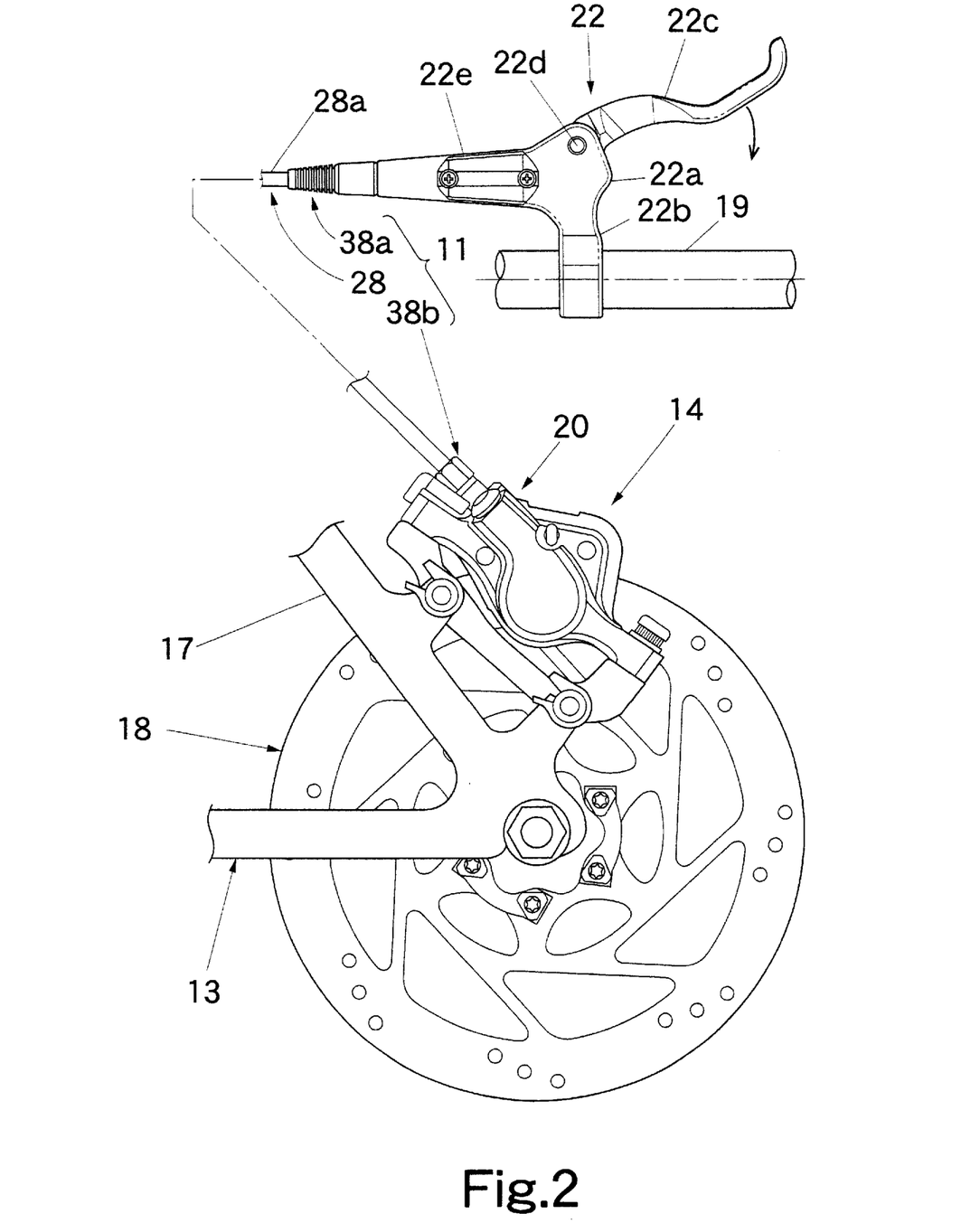
FIG. 2 is a side elevational view of the rear disc brake assembly using the hydraulic hose assembly between the rear brake operating mechanism and the rear brake caliper of the bicycle illustrated in FIG. 1.

Referring initially to FIGS. 1 and 2, a bicycle 10 is illustrated with hydraulic hose assemblies 11 in accordance with a preferred embodiment of the present invention. The hydraulic hose assemblies 11 are illustrated in conjunction with front and rear disc brake assemblies 12 and 14. The front and rear disc brake assemblies 12 and 14 are relatively conventional fluid operated disc brakes fixedly coupled to a frame 13. Therefore, the disc brake assemblies 12 and 14 will not be discussed or illustrated in detail herein. Of course, it will be apparent to one skilled in the art from this disclosure that the hydraulic hose assembly 11 of the present invention can be used with other hydraulically operated bicycle components such gear shifting systems.

Turning to the illustrated embodiment of the present invention, the front disc brake assembly 12 is fixedly coupled to a front fork 15 of the frame 13, and the rear disc brake assembly 14 is fixedly coupled to the rear fork 17 of the frame 13. The frame 13 includes a handlebar 19 mounted to the front fork 15 to steer the bicycle 10. The bicycle 10 includes a pair of wheels 16 rotatably coupled to the bicycle frame 13. One wheel 16 is coupled to the front fork 15, and one wheel 16 is coupled to the rear fork 17. Each wheel 16 has a disc brake rotor 18 fixedly coupled thereto in a conventional manner.

The bicycle 10 and various components thereof are relatively conventional. Therefore, bicycle 10 and its various components will not be discussed or illustrated in detail herein, except as these components relate to front and rear disc brake assemblies 12 and 14 in accordance with the preferred embodiments of the present invention. Moreover, the front and rear disc brake assemblies 12 and 14 are substantially identical. Therefore, only the rear disc brake assembly 14 will be discussed or illustrated in detail herein. However, it will be apparent to one skilled in the art from this disclosure that the descriptions of the rear disc brake assembly 14 also apply to the front disc brake assembly 12.

The rear disc brake assembly 14 basically includes a disc brake rotor 18, a caliper 20 and a rear brake operating mechanism 22. The caliper 20 and the brake operating mechanism 22 are fluidly coupled together by the hydraulic hose assembly 11. The hydraulic hose assembly 11 basically includes a flexible hose 28, a flexible boot or cover 30, a pair of rigid tubular inserts 32, a pair of connecting fasteners 34 and a pair of tubular bushings 36. The cover 30, the rigid tubular inserts 32, the connecting fasteners 34 and the tubular bushings 36 form a pair of hydraulic hose fittings 38. In other words, the flexible hose 28 has a first hydraulic hose fitting 38a located at a first end portion 28a and a second hydraulic hose fitting 38b located at a second end portion 28b with an interior passage 28c extending between the first and second end portions 28a and 28b of the flexible hose 28. The second hydraulic hose fitting 38b is identical to the first hydraulic hose fitting 38a, except that the second hydraulic hose fitting 38b does not include the cover 30.

The caliper 20 and the rear brake operating mechanism 22 are conventional bicycle components that are hydraulically operated in a conventional manner. Since these components are conventional, they will not be discussed and/or illustrated in detail herein. Preferably, the rear disk brake assembly 14 utilizes mineral oil as the hydraulic fluid for actuating the caliper 20 in response to operation of the rear brake operating mechanism 22. More specifically, when of the rear brake operating mechanism 22 is operated, this causes the hydraulic fluid to be pressurized and thus causing the caliper 20 to apply a braking force on the disk brake rotor 18.

Figure 3:
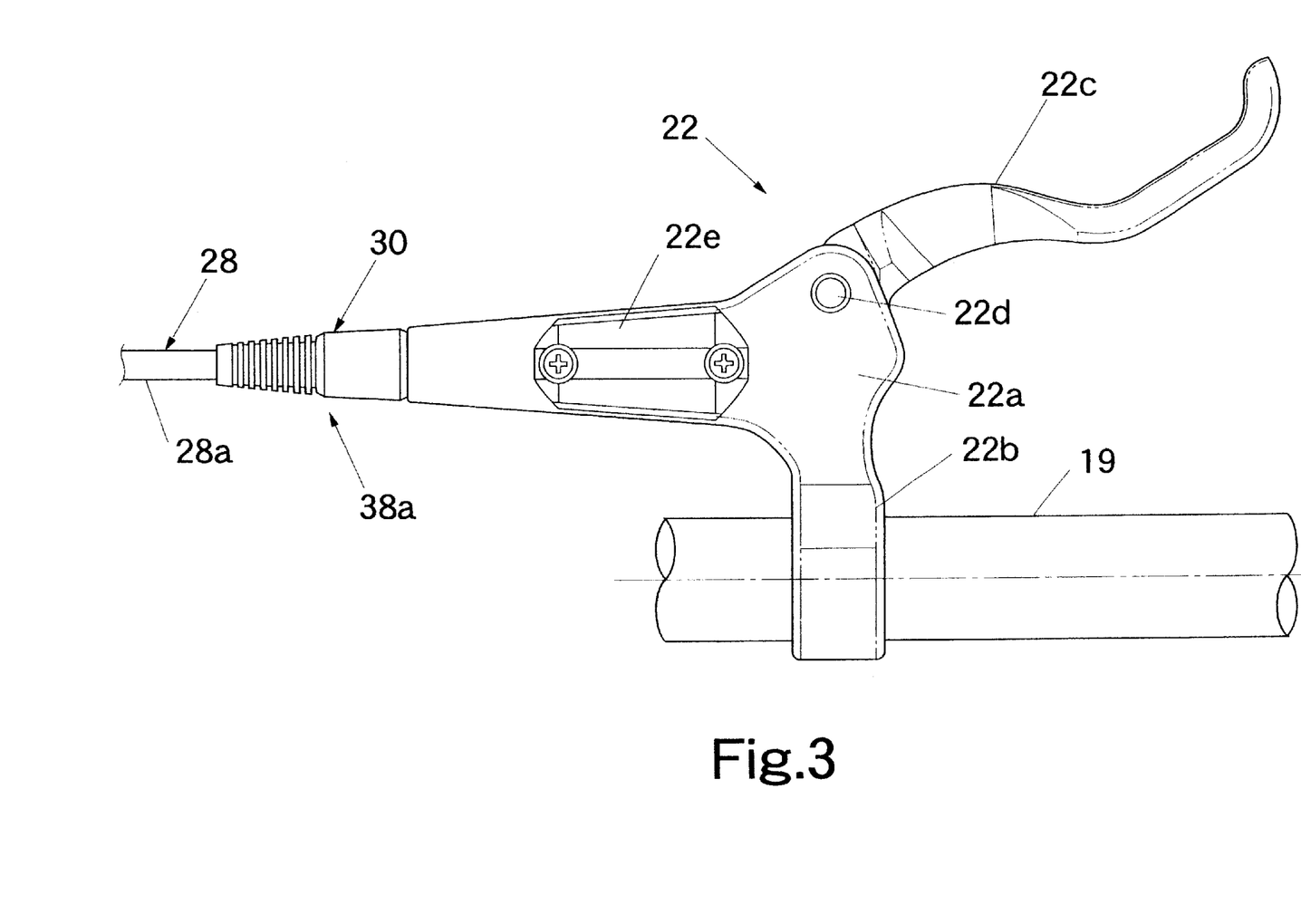
FIG. 3 is a top plan view of the rear disc brake operating mechanism using the hydraulic hose assembly illustrated in FIGS. 1 and 2.
Figure 4:
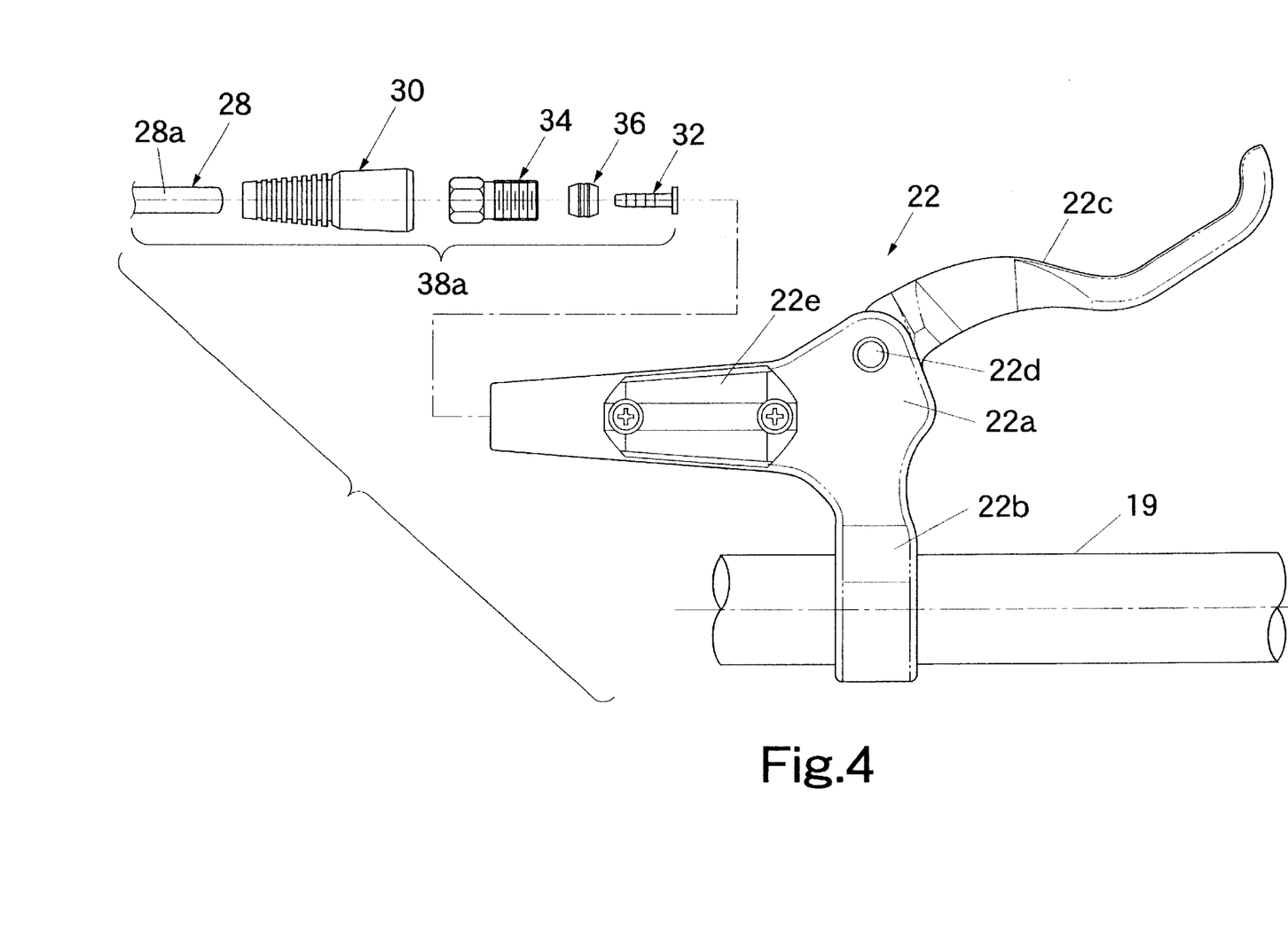
FIG. 4 a partially exploded top plan view of the hydraulic hose assembly and the rear disc brake operating mechanism illustrated in FIGS. 1–3.

The rear brake operating mechanism 22 basically has a main housing portion 22a, a clamping portion 22b and a brake lever 22c pivotally coupled to the housing portion 22a via a pivot pin 22d. The brake operating mechanism 22 is supported on the handlebar 19 via the mounting portion 22b in a conventional manner. The housing portion 22a houses a master cylinder (not shown) and a piston (not shown) and a reservoir 22e. The reservoir 22e contains the hydraulic fluid (mineral oil) which is pressurized by movement of the piston in the master cylinder in response to the pivotal movement of the brake lever 22 towards the handlebar 19.

Since the operation of the master cylinder and piston are conventional, these parts will not be discussed or shown herein.

Figure 5:
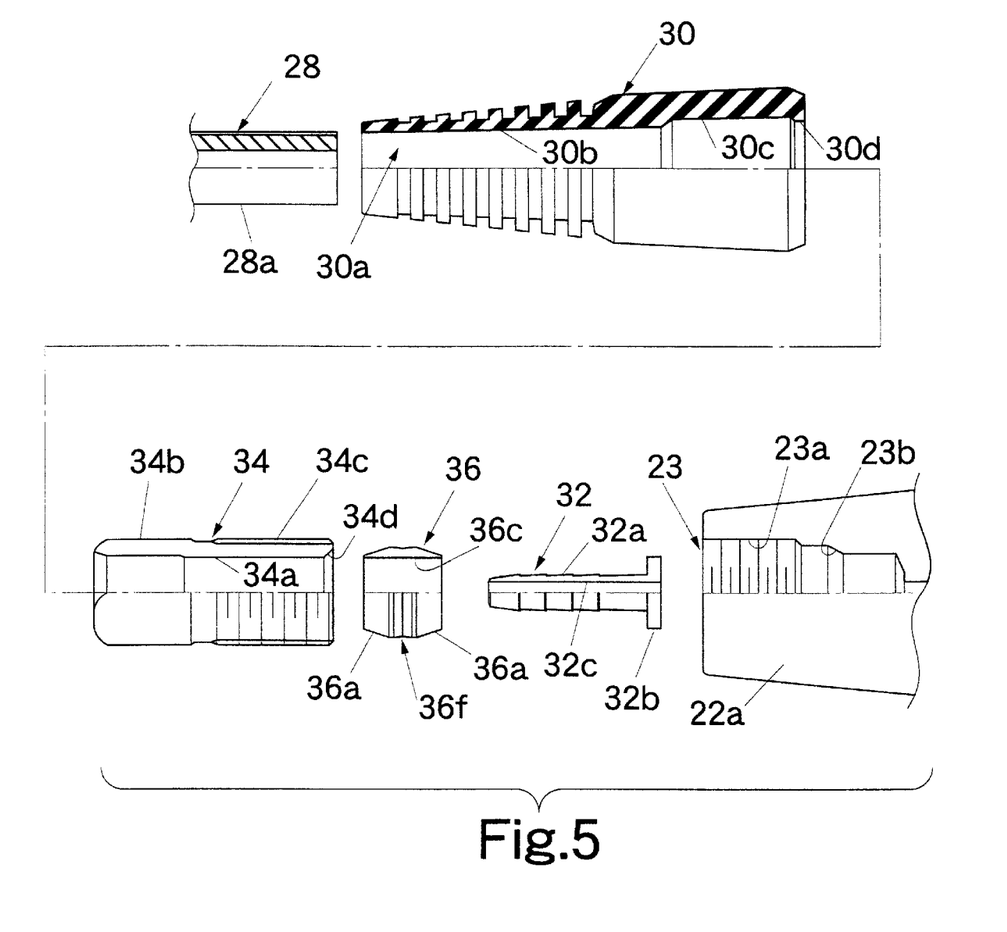
FIG. 5 is an exploded top plan view of the hydraulic hose assembly illustrated in FIGS. 2–4 with the lower half shown in cross-section.
Figure 6:
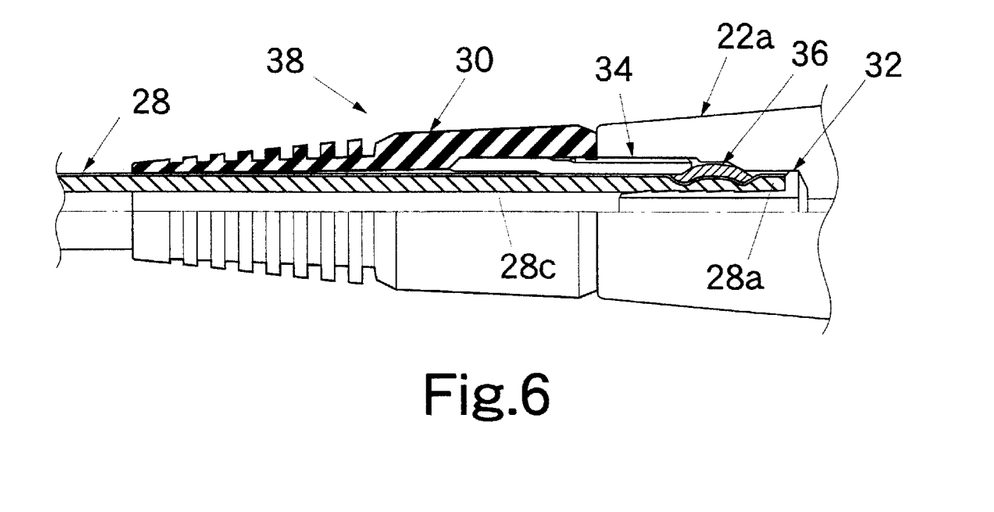
FIG. 6 is a partial cross-sectional view of the hydraulic hose assembly illustrated in FIGS. 2–5.
Figure 7:
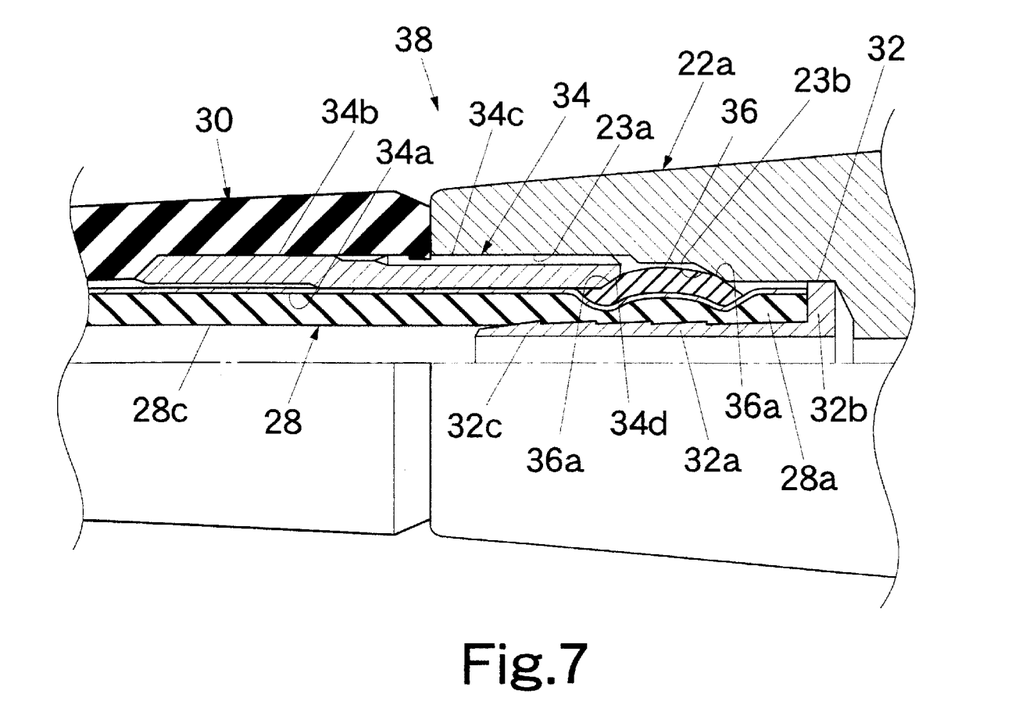
FIG. 7 is an enlarged, partial cross-sectional view of the hydraulic hose assembly illustrated in FIGS. 2–6.

As best seen in FIGS. 5–7, the housing portion 22a of the rear brake operating mechanism 22 has an internal passage 23 that is fluidly connected to the reservoir 22e. The internal passageway 23 has threads 23a at its free end for threadedly coupling the connecting fastener 34 thereto. A conical abutment surface 23b is formed inwardly from the threads 23a. The conical abutment surface 23b engages the bushing 36 to deform the bushing 36 radially inwardly when the connecting fastener 34 is threaded into threads 23a so as to apply an axial force on the bushing 36.

The flexible hose 28 is also a conventional component that is preferably constructed of a rubber tube having a metallic braided sheath. The interior passageway 28c of the hydraulic hose preferably has a diameter of about 2.3 mm±0.2. The outer diameter of the flexible hose 28 is preferably about 5.1 mm±0.2. Since the flexible hose 28 is relatively conventional, the flexible hose 28 will not be discussed or illustrated in detail herein.

Referring now to FIGS. 8–12, one of the tubular bushings 36 is illustrated. The tubular bushing 36 is preferably constructed of a relatively deformable metallic material such as copper or a copper alloy. As discussed below, the bushing 36 is designed to be compressed from the initial state shown in FIG. 5 to the deformed state shown in FIGS. 6 and 7. More specifically, upon coupling the hydraulic hose fitting 38a to the rear brake operating mechanism 22, the bushing 36 is deformed by the axial force of the connecting fastener 34 that forces the bushing 36 against the abutment surface 23b of housing portion 22a of the brake operating mechanism 22.

Figure 8:
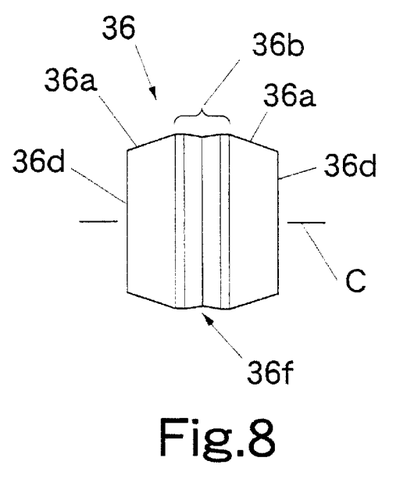
FIG. 8 is an enlarged side elevational view of the bushing of the hydraulic hose assembly illustrated in FIGS. 2–6.
Figures 10, 11:
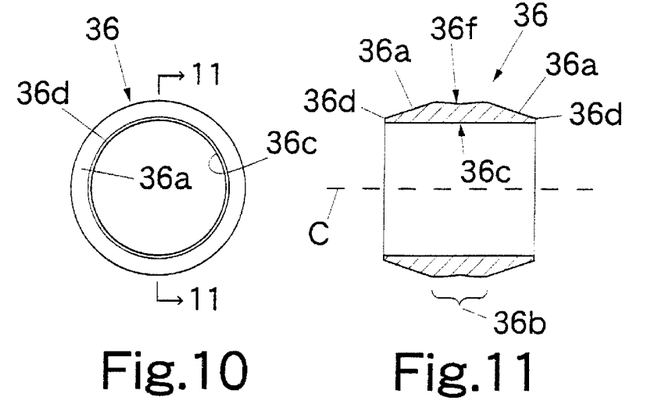
FIG. 10 is an enlarged left end elevational view of the bushing illustrated in FIGS. 8 and 9.
FIG. 11 is an enlarged cross-sectional view of the bushing illustrated in FIGS. 8–10 as seen along section line 11—11 in FIG. 10.
Figure 12:
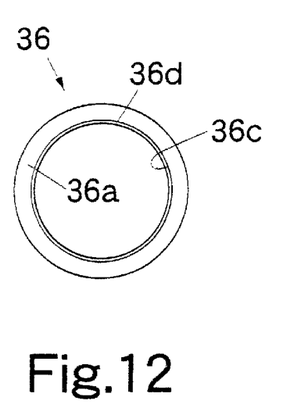
FIG. 12 is an enlarged right end elevational view of the bushing illustrated in FIGS. 8–11.
Figure 13:
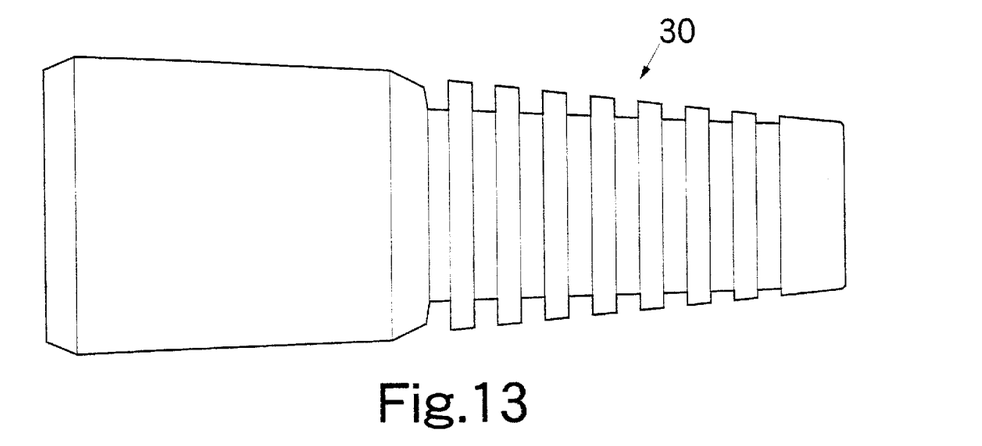
FIG. 13 is an enlarged side elevational view of the cover or boot of the hydraulic hose assembly illustrated in FIGS. 2–6.
Figure 14:
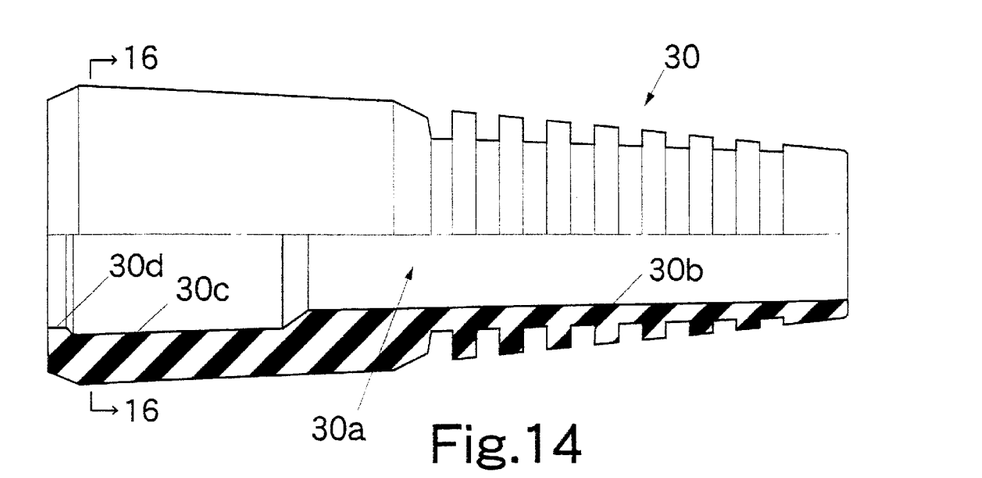
FIG. 14 is an enlarged partial cross-sectional view of the cover illustrated in FIG. 13.
Figure 15:
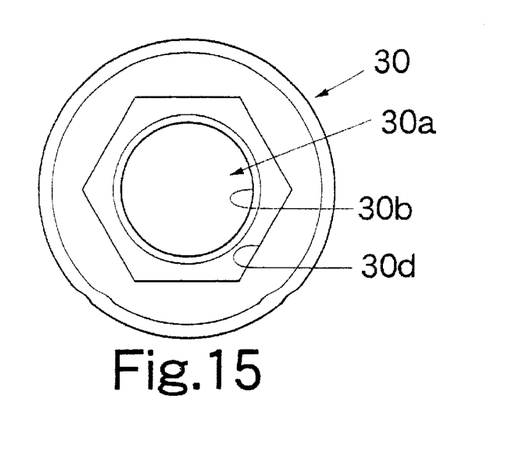
FIG. 15 is an enlarged left end elevational view of the cover illustrated in FIGS. 13 and 14.
Figure 16:
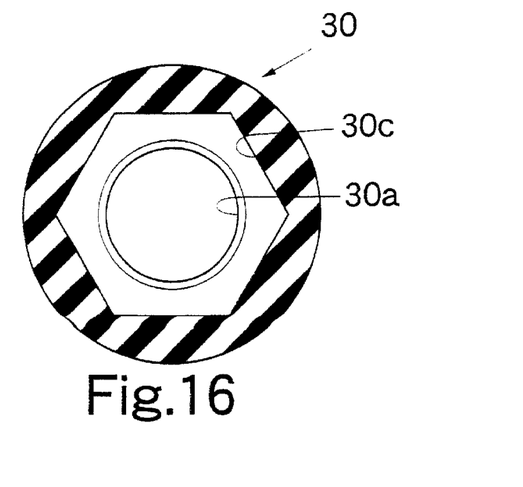
FIG. 16 is an enlarged transverse cross-sectional view of the cover illustrated in FIGS. 13–15 as seen along section line 16—16 in FIG. 14.

As best seen in FIG. 8, the tubular bushing 36 has a contoured outer surface with a pair (first and second) of annular inclined sections 36a and an annular intermediate section 36b located between the first and second annular inclined sections 36a. As seen in FIGS. 10–12, the tubular bushing 36 has a cylindrical inner surface 36c. The annular inclined sections 36a of the outer surface are radially spaced at their free ends from cylindrical inner surface 36c so as to form first and second axial ends 36d that are substantially perpendicular to the longitudinal center axis of bushing 36. Preferably, the inner diameter is substantially equal to the outer diameter of the flexible hose 28. More preferably, the inner diameter of cylindrical inner surface 36c is about 5.3 mm±0.05 when the flexible hose 28 has an outer diameter of 5.1 mm±0.2.

The first and second annular inclined sections 36a are preferably conically shaped surfaces that form an 18° angle with the cylindrical inner surface 36c or the center longitudinal axis C. The annular inclined sections 36a have axial lengths of about 2.3 mm. While the first and second annular inclined sections 36a are preferably conically shaped surfaces, it will be apparent to those skilled in the art from this disclosure, that the first and second annular inclined sections 36a can have other configurations so long as the bushing 36 properly functions in accordance with the present invention.

Figure 9:
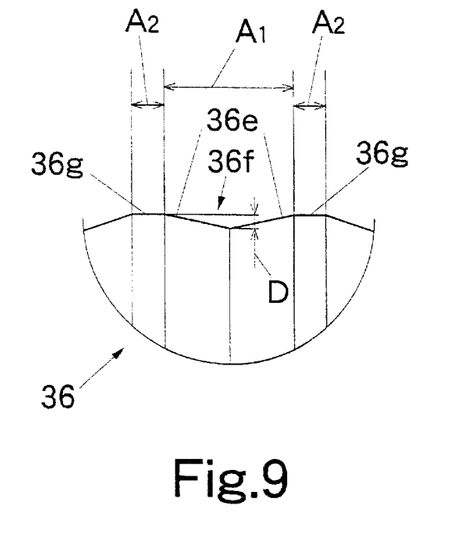
FIG. 9 is an enlarged, partial side elevational view of the bushing illustrated in FIG. 8.

As best seen in FIG. 9, the intermediate section 36b has a pair of oppositely inclined surfaces 36e that forms an annular recess 36f. Preferably, the annular recess 36f is centrally located between the (first and second) axial ends 36d. In the first embodiment, the first and second oppositely inclined surfaces 36e are conically shaped surfaces that are arranged to form an annular V-shaped groove. The combined axial length $A_1$ of the first and second oppositely inclined surfaces 36e is preferably about 1.4 mm±0.2. The annular recess 36f has a radial depth D that is preferably 0.07 mm+0.03/−0.02.

The intermediate section 36b preferably also includes first and second cylindrical surfaces 36g. The cylindrical surfaces 36g are contiguously disposed between the annular inclined sections 36a and the first and second oppositely inclined surfaces 36e, respectively. Preferably, the first and second cylindrical surfaces 36g have an axial length $A_2$ that is about 0.3 mm. The first and second cylindrical surfaces preferably have a diameter of about 6.9 mm. Accordingly, the first and second inclined sections 36a decrease in radial width as the first and second inclined sections 36a approach the axial ends 36d, respectively.

Turning now to FIGS. 13–16, the flexible boot or cover 30 is illustrated in more detail. The cover 30 is preferably constructed of a flexible elastomeric material with good sealing properties. The cover 30 has an axial extending bore 30a that receives an end portion 28a of the flexible hose 28 and the connecting fastener 34. The bore 30a includes a cylindrical or slightly conical section 30b, a hexagonal section 30c and a hexagonal sealing flange 30d. The cylindrical or slightly conical section 30b has a diameter or width that is sized to receive the end portion 28a of the flexible hose 28 for creating a watertight seal therebetween. The hexagonal section 30c of bore 30a is sized to receive a corresponding portion of the connecting fastener 34. The flange 30d engages the connecting fastener 34 to form a watertight seal therebetween.

Figure 17:
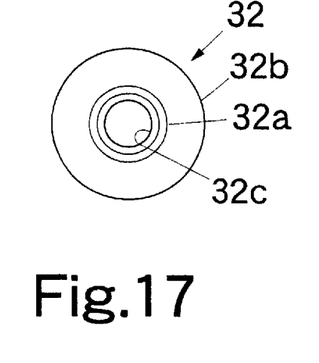
FIG. 17 is an enlarged right end elevational view of the hose insert of the hydraulic hose assembly illustrated in FIGS. 2–6.
Figure 18:
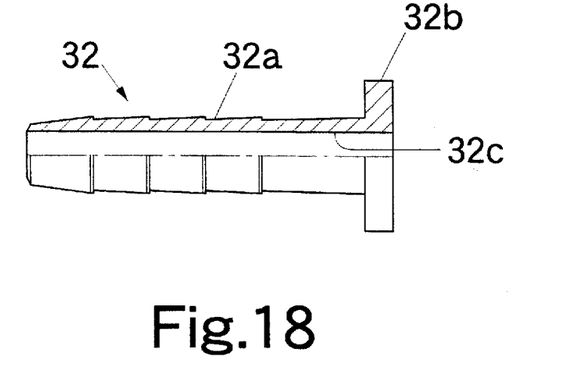
FIG. 18 is an enlarged partial cross-sectional view of the tubular hose insert illustrated in FIG. 17.

Referring now to FIGS. 17 and 18, the tubular insert 32 is illustrated in more detail. The tubular insert 32 has a tubular section 32a and an annular flange section 32b, a longitudinal passageway 32c passes through the tubular section 32a and the flange section 32b. The outer surface of the tubular portion 32a has a plurality of inclined barbs such that the tubular section 32a is securely retained in the interior passage 28c of the flexible hose 28. The tubular insert 32 is designed to be retained in the ends of the flexible hose 28 to provide radial support at the ends of the flexible hose 28. Accordingly, the tubular insert 32 is constructed of a rigid material such as a metallic material. For example, the tubular insert 32 can be formed of a copper or a copper alloy. Of course, any suitable rigid material that can carry out the present invention can be utilized.

Figure 19:
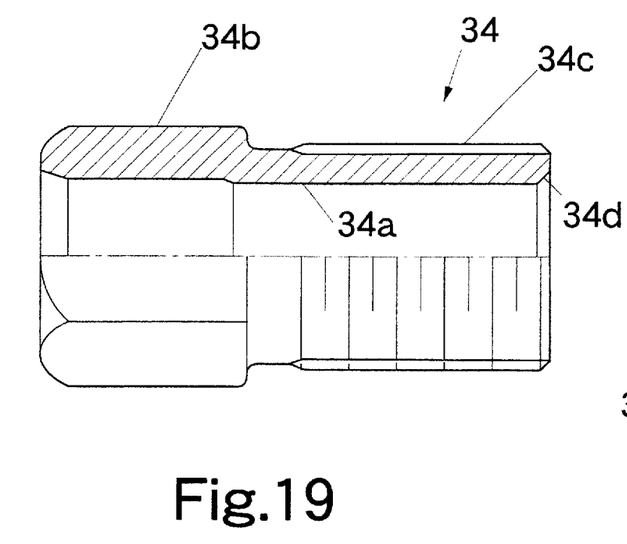
FIG. 19 is an enlarged partial cross-sectional view of the connecting fastener of the hydraulic hose assembly illustrated in FIGS. 2–6.
Figure 20:
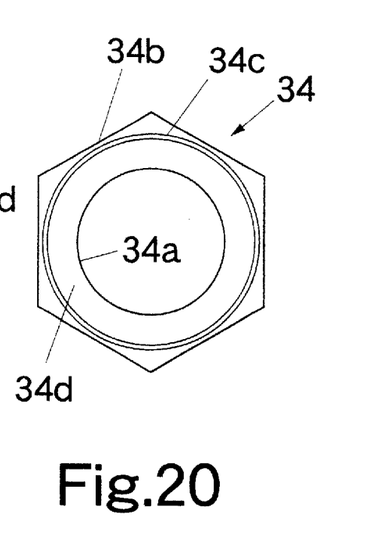
FIG. 20 is an enlarged right end elevational view of the connecting fastener of the hydraulic hose assembly illustrated in FIG. 19.
Figure 21:
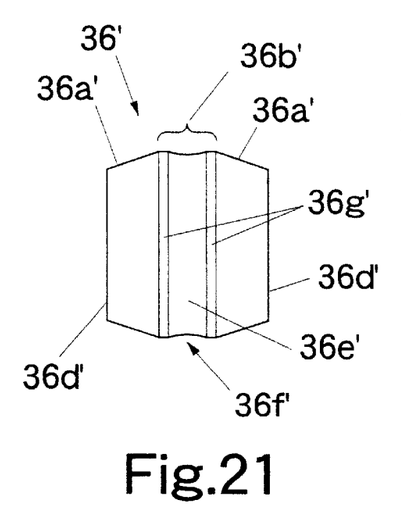
FIG. 21 is an enlarged side elevational view of an alternate bushing for the hydraulic hose assembly illustrated in FIGS. 2–6.

Referring now to FIGS. 19 and 20, the connecting fastener 34 is illustrated in more detail. The connecting fastener 34 is constructed of a hard metallic material having a hardness greater than the hardness of the bushing 36 so that the connecting fastener 34 can deform the bushing 36 as seen in FIGS. 6 and 7. Basically, the connecting fastener 34 is a tubular member having an internal bore 34a, an hexagonal outer surface 34b and a threaded section 34c. A conical abutment surface 34d is formed at the free end of the connecting fastener 34 having the threaded section 34c. The conical abutment surface 34d is designed to engage the bushing 36 so as to deform the bushing 36 radially inwardly when the connecting fastener 34 is threaded into the internal passage 23 of the housing portion 22 of the brake operating mechanism 22.

Accordingly, in assembling hydraulic hose assembly 38a, the cover 30 is inserted over the first end portion 28a of the flexible hose 28 such that the section 30b engages the outer surface of the flexible hose 28. Now, the flexible hose 28 passes through the internal bore 34a of the connecting fastener 34. The flexible hose 28 is now inserted through the internal bore 36c of the bushing 36. Next, the tubular insert 32 is inserted into the interior passage 28c of the flexible hose 28. Next, the connecting fastener 34 is threaded onto the threads 23a of the housing portion 22a. The attachment of the connecting fastener 34 to the housing portion 22a causes the abutment 34d of the connecting fastener 34 to engage one of the inclined sections 36a of the bushing 36, while the abutment 23b of the housing portion 22a engages the other inclined section 36a of the bushing 36. Thus, the axial compression of the bushing 36 will cause radial deformation of the inclined sections 36a of the bushing 36 to fixedly secure or crimp the flexible hose 28 onto the tubular insert 32 as seen in FIGS. 6 and 7. Due to the annular recess 36f of the bushing 36, radial expansion of the bushing 36 at the intermediate section 36b is limited. Thus, when it becomes necessary to replace the hydraulic hose fitting 38a, the connecting fastener 34 and the tubular insert 32 can be easily separated from the bushing 36. This allows the connecting fastener 34 and the tubular insert 32 to be reused.

Alternate Bushing Illustrated in FIGS. 21–25

Referring now to FIGS. 21–25, an alternate bushing 36' is illustrated in accordance with an alternate embodiment of the present invention. The alternate bushing 36' is used in the hydraulic hose assembly 11, discussed above. Thus, when the alternate bushing 36' is used in the hydraulic hose assembly 11, the alternate bushing 36' will function in the same manner as the bushing 36 discussed above. In view of the similarity between the alternate bushing 36' and the bushing 36, the description and illustrations of the alternate bushing 36' have been omitted for the sake of brevity.

The alternate bushing 36' has a contoured outer surface with a pair of annular inclined sections 36a' and an annular intermediate section 36b' located between the first and second annular inclined sections 36a'. The alternate bushing 36' has a cylindrical inner surface 36c'. The annular inclined sections 36a' of the outer surface are radially spaced at their free ends from cylindrical inner surface 36c' so as to form first and second axial ends 36d' that are substantially perpendicular to the longitudinal center axis of the alternate bushing 36'. Preferably, the inner diameter is substantially equal to the outer diameter of the flexible hose 28. Moreover, the dimensions of the alternate bushing 36' have the same dimensions and configuration as the bushing 36, except that a curved groove is formed in the outer surface of the alternate bushing 36' instead of a V-shaped groove.

The first and second annular inclined sections 36a' are preferably conically shaped surfaces that form an 18° angle with the cylindrical inner surface 36c'. While the first and second annular inclined sections 36a' are preferably conically shaped surfaces, it will be apparent to those skilled in the art from this disclosure, that the first and second annular inclined sections 36a' can have other configurations so long as the bushing 36' properly functions in accordance with the present invention.

Figure 22:
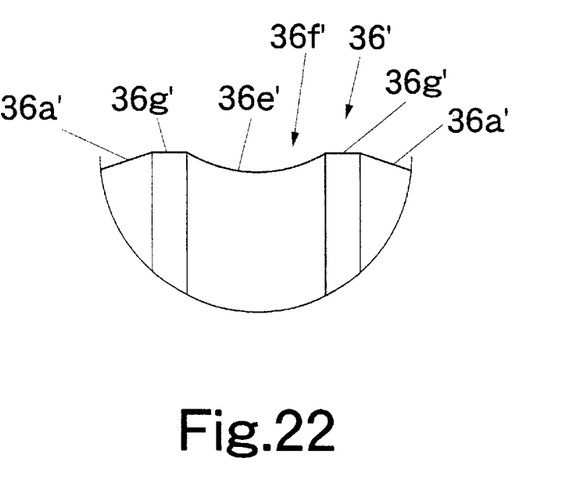
FIG. 22 is an enlarged, partial side elevational view of the alternate bushing illustrated in FIG. 21.
Figure 23:
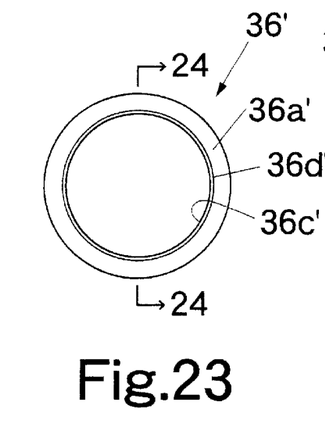
FIG. 23 is an enlarged left end elevational view of the alternate bushing illustrated in FIGS. 21 and 22.
Figures 24, 25:
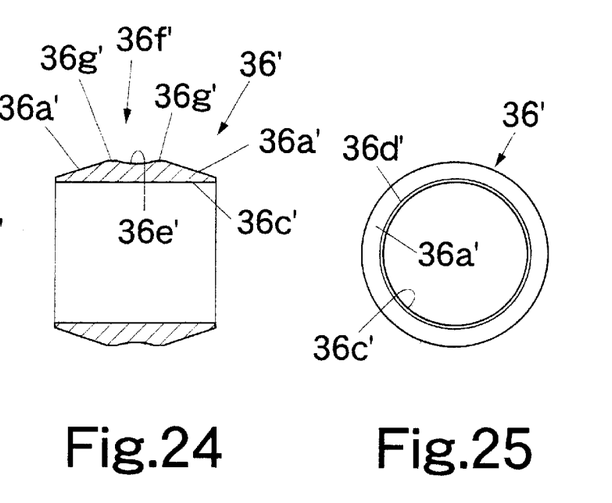
FIG. 24 is an enlarged cross-sectional view of the alternate bushing illustrated in FIGS. 21–23 as seen along section line 24—24 in FIG. 23.
FIG. 25 is an enlarged right end elevational view of the alternate bushing illustrated in FIGS. 21–24.

The intermediate section 36b' has a pair of oppositely inclined or curved surfaces 36e' that surfaces are arranged to form a smooth annular curved groove or recess 36f'. The first and second oppositely inclined or curved surfaces 36e' have the same curvature to form a continuos arc with a uniform curvature. Preferably, the annular recess 36f' is centrally located between the axial ends 36d'.

The intermediate section 36b' preferably also includes first and second cylindrical surfaces 36g'. The cylindrical surfaces 36g' are contiguously disposed between the annular inclined sections 36a' and the first and second oppositely inclined surfaces 36e', respectively. Accordingly, the first and second inclined sections 36a' decrease in radial width as the first and second inclined sections 36a', approach the first and second axial ends 36d', respectively.

Second Embodiment

Figure 26:
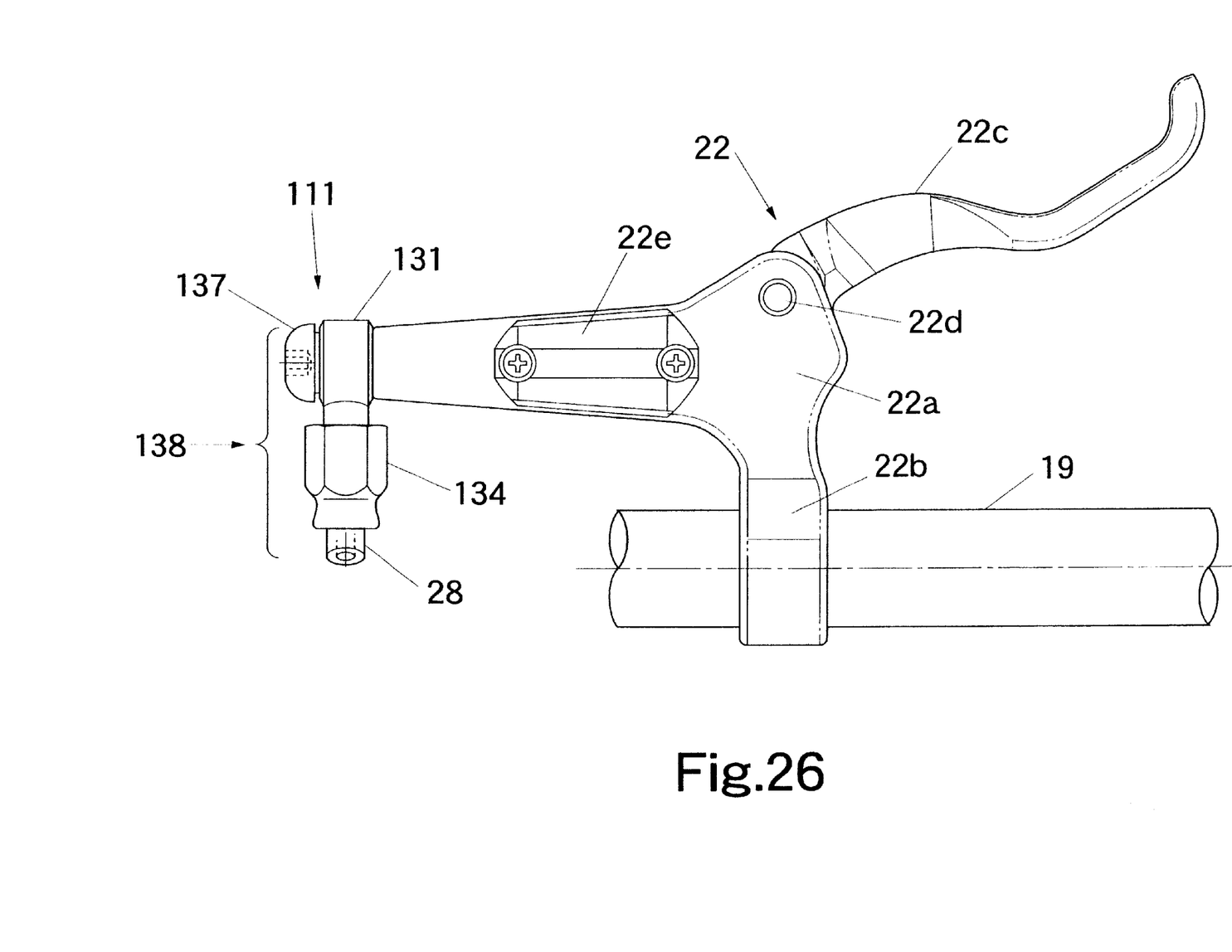
FIG. 26 is a top plan view of the rear disc brake assembly using a hydraulic hose assembly in accordance with an alternate embodiment of the present invention.
Figure 27:
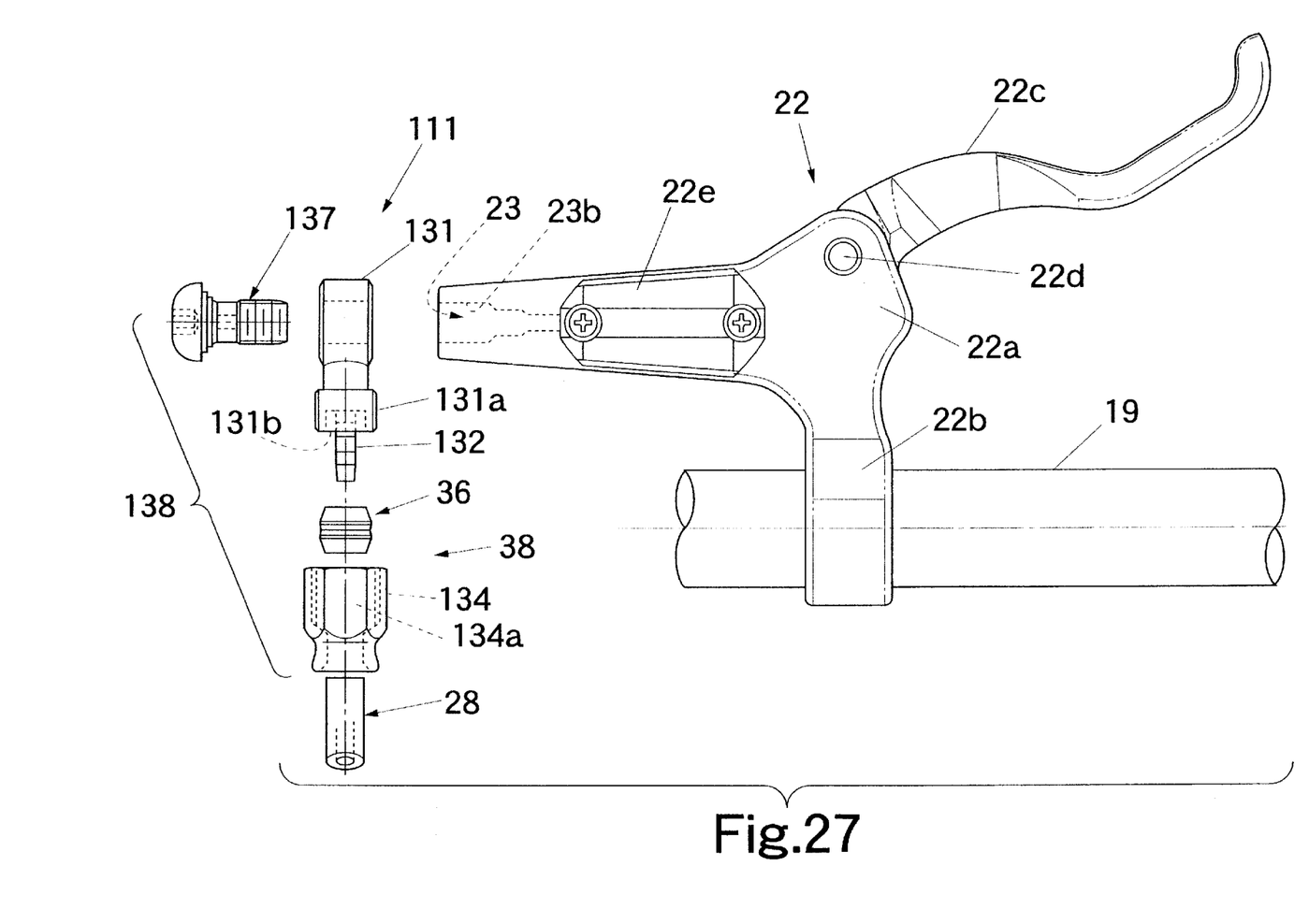
FIG. 27 is a partially exploded top plan view of the hydraulic hose assembly and the rear disc brake operating mechanism illustrated in FIG. 26.

Referring now to FIGS. 26 and 27, the rear brake operating mechanism 22 has an alternate hydraulic hose assembly 111 coupled thereto in accordance with a second embodiment of the present invention. In view of the similarity between the first embodiment and this alternate embodiment, the descriptions and illustrations of the various parts of the alternate hydraulic hose assembly 111 have been limited for the sake of brevity.

The alternate hydraulic hose assembly 111 is of relatively conventional construction, except that it utilizes the bushing 36 of the present invention. Of course, alternate hydraulic hose assembly 111 could also utilize the alternate bushing 36' instead of the bushing 36. The hydraulic hose assembly 111 can have a hydraulic hose fitting 138 of the present invention on one end of the flexible hose 28 and a conventional hydraulic hose fitting on the other end of the flexible hose 28. Alternatively, both ends of the flexible hose 28 can have the hydraulic hose fitting 138 of the present invention as seen in FIGS. 26 and 27.

The hydraulic hose assembly 111 basically includes the flexible hose 28 of the first embodiment, and at least one hydraulic hose fitting 138. The hydraulic hose fitting 138 basically includes a banjo 131 with a tubular insert 132, a connecting fastener or banjo nut 134, the bushing 36 of the first embodiment and an attachment bolt 137. In this embodiment, the tubular insert 132 is integrally formed with the banjo 131. The banjo 131 is attached to the housing portion 22a via the attachment bolt 137 such that hydraulic fluid can pass through the banjo 131 into the internal passageway 23 of the housing portion 22a. The banjo 131 is provided with an external threaded section 131a that threadedly receives the banjo nut 134 and an internal conical abutment surface 131b surrounding the tubular insert 132.

Accordingly, the flexible hose 28 passes through the internal bore 134a of the banjo nut 134 through the internal bore 36c of the bushing 36 and is secured on the end of the tubular insert 132 of the banjo 131. Next, the banjo nut 134 is threaded onto the threaded section 131a of the banjo 131. The attachment of the banjo nut 134 to the threaded section 131 a of the banjo 131 causes the internal abutment 134b of the banjo nut 134 to engage one of the inclined sections 36a of the bushing 36, while the internal conical abutment 131b of the banjo 131 engages the other inclined section 36a of the bushing 36. Thus, the axial compression of the bushing 36 will cause radial deformation of the inclined sections 36a of the bushing 36 to fixedly secure or crimp the flexible hose 28 onto the tubular insert 132. Due to the annular recess 36f of the bushing 36, radial expansion of the bushing 36 at the intermediate section 36b is limited. Thus, when it becomes necessary to replace the hydraulic hose fitting, the banjo 131 and the banjo nut 134 can be easily separated from the bushing 36. This allows the banjo 131 and the banjo nut 134 to be reused.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydraulic hose assembly comprising:
   a first housing portion with an internal passage that includes first internal threads adjacent its free end and a first conical abutment surface formed inwardly from the first internal threads;
   a flexible hose having a first end, a second end and an interior passage extending between said first and second ends of said flexible hose;
   a first rigid tubular insert located in said interior passage adjacent said first end of said flexible hose;
   a first connecting fastener having first external threads threadedly coupled to said first internal threads of said first housing portion, a second conical abutment surface formed adjacent its free end, and a longitudinal bore with a portion of said first end of said flexible hose disposed therein; and
   a first tubular bushing disposed over said flexible hose at said first rigid tubular insert, said first tubular bushing having inner and outer surfaces extending between first and second axial ends of said first tubular bushing, said outer surface of said first tubular bushing including
      a first inclined section decreasing in radial width as said first inclined section approaches said first axial end of said first tubular bushing,
      a second inclined section decreasing in radial width as said second inclined section approaches said second axial end of said first tubular bushing, and
      an intermediate section located between said first and second inclined sections, said intermediate section having an annular recess,
   said inner surface being circumferentially continuous along portions of said inner surface that are radially opposed to said first and second inclined sections of said outer surface to contact said flexible hose to form a pair of annular seals therebetween,
   said first conical abutment surface of said first housing portion contacting said first inclined section at a first contact point spaced from said first axial end of said first tubular bushing such that a portion of said first inclined section located between said first contact point and said first axial end of said first tubular bushing is free of contact with said first conical abutment surface of said first housing portion, and
   said second conical abutment surface of said first connecting fastener contacting said second inclined section at a second contact point spaced from said second axial end of said first tubular bushing such that a portion of said second inclined section located between said second contact point and said second axial end of said first tubular bushing is free of contact with said second conical abutment surface of said first connecting fastener.

2. The hydraulic hose assembly according to claim 1, further comprising
   a second housing portion with an internal passage that includes second internal threads adjacent its free end and a third conical abutment surface formed inwardly from the second internal threads;
   a second rigid tubular insert located in said interior passage adjacent said second end of said flexible hose;
   a second connecting fastener having second external threads threadedly coupled to said second internal threads of said second housing portion, a fourth conical abutment surface formed adjacent its free end, and a longitudinal bore with a portion of said second end of said flexible hose disposed therein; and
   a second tubular bushing disposed over said flexible hose at said second rigid tubular insert, said second tubular bushing having inner and outer surfaces extending between first and second axial ends of said second tubular bushing, said outer surface of said second tubular bushing including
      a third inclined section decreasing in radial width as said third inclined section of said second tubular bushing approaches said first axial end of said second tubular bushing,
      a fourth inclined section decreasing in radial width as said fourth inclined section of said second tubular bushing approaches said second axial end of said second tubular bushing, and
      an intermediate section located between said third and fourth inclined sections of said second tubular bushing, said intermediate section of said second tubular bushing having an annular recess,
   said inner surface of said second tubular bushing being circumferentially continuous along portions of said inner surface of said second tubular that are radially opposed to said third and fourth inclined sections of said outer surface of said second tubular to contact said flexible hose to form a pair of annular seals therebetween,
   said third conical abutment surface of said second housing portion contacting said third inclined section of said second tubular bushing at a third contact point spaced from said first axial end of said second tubular bushing such that a portion of said third inclined section of said second tubular bushing located between said third contact point and said first axial end of said second tubular bushing is free of contact with said third conical abutment surface of said second housing portion, and
   said fourth conical abutment surface of said second connecting fastener contacting said fourth inclined section of said second tubular bushing at a fourth contact point spaced from said second axial end of said second tubular bushing such that a portion of said fourth inclined section located between said fourth contact point and said second axial end of said second tubular bushing is free of contact with said fourth conical abutment surface of said second connecting fastener.

3. The hydraulic hose assembly according to claim 1, wherein
   said annular recess is formed by first and second oppositely inclined surfaces.

4. The hydraulic hose assembly according to claim 3, wherein
   said first and second oppositely inclined surfaces are conically shaped surfaces that are arranged to form an annular V-shaped groove.

5. The hydraulic hose assembly according to claim 4, wherein
   said first and second oppositely inclined surfaces have a combined axial length of about 1.4 mm.

6. The hydraulic hose assembly according to claim 3, wherein
said first and second oppositely inclined surfaces are arranged to form a smooth annular curved groove.

7. The hydraulic hose assembly according to claim 6, wherein
said first and second oppositely inclined surfaces have a combined axial length of about 1.4 mm.

8. The hydraulic hose assembly according to claim 3, wherein
said intermediate section further includes a first cylindrical surface disposed between said first inclined section and said annular recess, and a second cylindrical surface disposed between said second inclined section and said annular recess.

9. The hydraulic hose assembly according to claim 8, wherein
each of said first and second cylindrical surfaces has an axial length of about 0.3 mm.

10. The hydraulic hose assembly according to claim 9, wherein
said annular recess has a radial depth of about 0.07 mm.

11. The hydraulic hose assembly according to claim 10, wherein
said first and second oppositely inclined surfaces have a combined axial length of about 1.4 mm.

12. The hydraulic hose assembly according to claim 11, wherein
said first and second inclined sections are conically shaped surfaces.

13. The hydraulic hose assembly according to claim 12, wherein
said conically shaped surfaces of said first and second inclined sections have an angle of about 18 degrees relative to a center axis of said inner cylindrical surface.

14. The hydraulic hose assembly according to claim 1, wherein
said intermediate section further includes a first cylindrical surface disposed between said first inclined section and said annular recess, and a second cylindrical surface disposed between said second inclined section and said annular recess.

15. The hydraulic hose assembly according to claim 14, wherein
said first and second inclined sections are conically shaped surfaces.

16. The hydraulic hose assembly according to claim 15, wherein
said conically shaped surfaces of said first and second inclined sections have an angle of about 18 degrees relative to a center axis of said inner cylindrical surface.

17. The hydraulic hose assembly according to claim 16, wherein
said annular recess has a radial depth of about 0.07 mm.

18. The hydraulic hose assembly according to claim 17, wherein
each of said first and second cylindrical surfaces has an axial length of about 0.3 mm.

19. The hydraulic hose assembly according to claim 1, wherein
said annular recess has a radial depth of about 0.07 mm.

* * * * *